(12) United States Patent
Ayana et al.

(10) Patent No.: US 11,387,744 B2
(45) Date of Patent: Jul. 12, 2022

(54) GENERATOR POWER SYSTEMS WITH ACTIVE AND PASSIVE RECTIFIERS

(71) Applicant: Cummins Power Generation, Inc., Minneapolis, MN (US)

(72) Inventors: Elias M. Ayana, Blaine, MN (US); Brad K. Palmer, Ham Lake, MN (US)

(73) Assignee: Cummins Power Generation, Inc., Minneapolis, MN (US)

( * ) Notice: Subject to any disclaimer, the term of this patent is extended or adjusted under 35 U.S.C. 154(b) by 0 days.

(21) Appl. No.: 16/836,374

(22) Filed: Mar. 31, 2020

(65) Prior Publication Data
US 2020/0228027 A1    Jul. 16, 2020

Related U.S. Application Data

(63) Continuation of application No. 13/705,509, filed on Dec. 5, 2012, now abandoned.

(51) Int. Cl.
*H02M 7/219*    (2006.01)

(52) U.S. Cl.
CPC .......... *H02M 7/219* (2013.01); *H02M 7/2195* (2021.05); *Y02B 70/10* (2013.01)

(58) Field of Classification Search
CPC .......... H02M 7/219; H02M 2007/2195; Y02B 70/1408; Y02B 70/10
See application file for complete search history.

(56) References Cited

U.S. PATENT DOCUMENTS

| 5,625,276 | A  | 4/1997 | Scott et al. |
| 5,642,021 | A  | 6/1997 | Laing et al. |
| 6,239,582 | B1 | 5/2001 | Buzan et al. |
| 6,359,800 | B1 | 3/2002 | Liang |
| 7,042,110 | B2 | 5/2006 | Mikhail et al. |
| 7,203,078 | B2 | 4/2007 | Datta et al. |
| 7,557,544 | B2 | 7/2009 | Heinz et al. |

(Continued)

FOREIGN PATENT DOCUMENTS

| CN | 1160460 | 9/1997 |
| CN | 1713512 | 12/2005 |

(Continued)

OTHER PUBLICATIONS

Lega et al, "Variable Speed Generating Unit for Stand-Alone Microgrids", Sep. 2012, pp. 140-145, downloaded from the internet https://ieeexplore.ieee.org/document/6347741?source=IQplus (Year: 2012).*

(Continued)

*Primary Examiner* — Rocio Del Mar Perez-Velez
*Assistant Examiner* — Olvin Lopez Alvarez
(74) *Attorney, Agent, or Firm* — Taft Stettinius & Hollister LLP

(57) ABSTRACT

A system comprising a controllable alternating current power source; an active rectifier coupled to the controllable alternating current power source and configured to rectify an output of the controllable alternating current power source to supply a direct current to a load; and a controller configured to adjust at least one of a parameter of the controllable alternating current power source and a parameter of the active rectifier in response to a target output.

20 Claims, 5 Drawing Sheets

(56) References Cited

U.S. PATENT DOCUMENTS

| | | |
|---|---|---|
| 2001/0039230 A1 | 11/2001 | Severinsky |
| 2003/0151259 A1 | 8/2003 | Feddersen et al. |
| 2004/0085046 A1* | 5/2004 | Ye ................... F02N 11/04 322/13 |
| 2005/0276082 A1 | 12/2005 | Panda |
| 2005/0286279 A1 | 12/2005 | Datta et al. |
| 2006/0072352 A1 | 4/2006 | Ghosh et al. |
| 2008/0103632 A1 | 5/2008 | Saban |
| 2008/0148726 A1 | 6/2008 | Halsey |
| 2008/0164697 A1 | 7/2008 | Schram et al. |
| 2009/0091069 A1 | 4/2009 | Plahn et al. |
| 2009/0206606 A1 | 8/2009 | Jorgensen |
| 2009/0261599 A1 | 10/2009 | Alston et al. |
| 2010/0027304 A1 | 2/2010 | Wang et al. |
| 2010/0051368 A1* | 3/2010 | Donnelly ........... B60W 20/15 180/65.285 |
| 2010/0094490 A1 | 4/2010 | Alston |
| 2010/0100292 A1* | 4/2010 | Lv ................... F02D 29/06 701/60 |
| 2010/0105259 A1 | 4/2010 | Wejrzanowski et al. |
| 2010/0220501 A1 | 9/2010 | Krause |
| 2010/0286835 A1 | 11/2010 | Nyborg et al. |
| 2011/0134663 A1 | 6/2011 | Sakakibara |
| 2011/0181115 A1 | 7/2011 | Ivanov |
| 2011/0190970 A1 | 8/2011 | Moriya |
| 2011/0215641 A1 | 9/2011 | Peterson et al. |
| 2011/0218692 A1 | 9/2011 | Li |
| 2011/0235381 A1 | 9/2011 | Wolf |
| 2012/0038167 A1 | 2/2012 | Kjaer et al. |
| 2012/0056602 A1 | 3/2012 | Li et al. |
| 2012/0081058 A1 | 4/2012 | Bortolus et al. |
| 2012/0104754 A1 | 5/2012 | Rudolf et al. |
| 2012/0327693 A1 | 12/2012 | Cousineau |
| 2013/0041516 A1 | 2/2013 | Rockenfeller |
| 2013/0215657 A1 | 8/2013 | Heath et al. |
| 2013/0056602 A1 | 12/2013 | Burnham et al. |
| 2013/0325214 A1 | 12/2013 | Vos |
| 2013/0327285 A1* | 12/2013 | Burnham ........... B60H 1/00428 123/2 |
| 2014/0015257 A1* | 1/2014 | Dobbs ................. F02D 41/0007 290/40 B |
| 2014/0119074 A1 | 5/2014 | Courtney et al. |
| 2014/0182564 A1 | 7/2014 | Venton |

FOREIGN PATENT DOCUMENTS

| | | |
|---|---|---|
| CN | 101447687 | 6/2009 |
| EP | 2538546 | 12/2012 |

OTHER PUBLICATIONS

Panora, "Design and Testing of an Inverter-Based Combined Heat and Power Module for Special Application in a Microgrid", 2007, pp. 1-8 downloaded from https://ieeexplore.ieee.org/document/4275471 (Year: 2007).*

International Search Report and Written Opinion, International Application No. PCT/US2013/073420, dated Apr. 24, 2014, 10 pgs.

Chinese Search Report, Chinese Patent Office, Chinese Patent Application No. 2013800721564, dated Feb. 27, 2017, 3 pgs.

* cited by examiner

GENERATOR POWER SYSTEMS WITH ACTIVE AND PASSIVE RECTIFIERS

CROSS-REFERENCE TO RELATED APPLICATION

The present application is a continuation of U.S. patent application Ser. No. 13/705,509 filed on Dec. 5, 2012, which is incorporated herein by reference in its entirety.

BACKGROUND

Embodiments relate to power systems and, in particular, to power systems with active rectifiers.

Generators can be used to generate direct current (DC) or alternating (AC) power for remote installations, such as remote telecommunication sites. Demand for power at such sites can vary based on a volume of communication traffic. Loads, such as communication traffic, may be greater during one period, requiring increased power, while traffic is less during another period, requiring less power. Operating conditions needed to maintain the supplied DC voltage and/or power in a required range can result in the generator operating at an inefficient operating point.

BRIEF DESCRIPTION OF THE DRAWINGS

The description herein makes reference to the accompanying drawings wherein like reference numerals refer to like parts throughout the several views, and wherein.

DETAILED DESCRIPTION

Embodiments will be described with reference to the drawings. Although particular embodiments will be described, the scope of the following claims is not limited to these embodiments. In contrast, alterations, modifications, combinations, or the like can be made.

Figure 1:
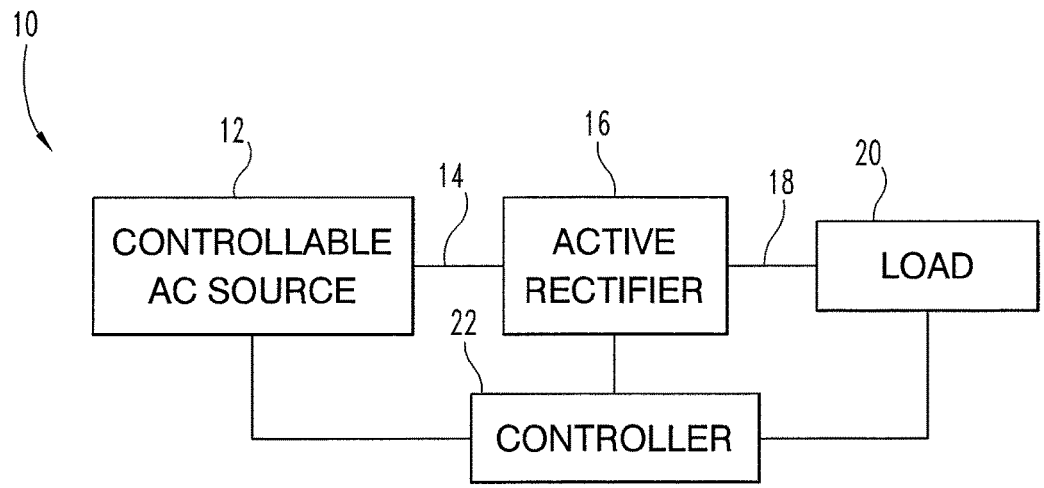
FIG. 1 is a block diagram illustrating a power system according to an embodiment.

FIG. 1 is a block diagram illustrating a power system according to an embodiment. In this embodiment, the system 10 includes a controllable alternating current power source 12, an active rectifier 16, and a controller 22. The system 10 is coupled to a load 20.

The controllable alternating current power source 12 is configured to generate an alternating current (AC) output 14. For example, the alternating current power source 12 can be an engine and generator or genset, such as a diesel generator or spark ignited fuel generator. In another example, the power source 12 can be a gas turbine engine, wind turbine, hydro power, steam engine, steam turbine, stirling engine, or other external or internal combustion engine or rotating or linear power source that is coupled to a generator. The generator of a genset forming the controllable AC source output 14 can be, but is not limited to, a brushed alternator, a permanent magnet alternator, or other synchronous or asynchronous alternator. The power source 12 is controllable in that the output 14 can be controlled. For example, the power, voltage, current, frequency, speed, or the like of the output 14 can be controlled.

The active rectifier 16 is configured to rectify the output 14 of the power source 12. In particular, the active rectifier 16 is configured to generate a direct current (DC) output 18 from the alternating current (AC) output 14. The rectified direct current output 18 is supplied to the load 20.

Although the term direct current has been used with output 18, the output 18 can, but need not be a pure direct current output. That is, the output 18 can include voltage and current variations present in rectified power sources. In addition, it is noted that load 20 can utilize the DC output 18 directly or can include additional power conditioning circuits to further condition the DC output 18 for use, such as inductors, capacitors, regulators, switching power supplies, and/or inverters.

The controller 22 is coupled to the power source 12, the active rectifier 16, and the load 20. Although the controller 22 is illustrated as directly coupled, the controller 22 can be coupled to such components indirectly, through other components, through sensors, through communication interfaces, isolation circuits, or the like, or be divided and integrated with other components.

The controller 22 is configured to adjust at least one of a parameter of the power source 12 and a parameter of the active rectifier 16 in response to a target output. For example, such parameters can include a speed of the power source 12, a target output for the AC source output 14, a duty cycle of the active rectifier 16, or the like. Accordingly, the controller 22 can be configured to adjust operation of one or both of the power source 12 and the active rectifier 16 to achieve a desired efficiency and voltage and current output.

In an embodiment, the controller 22 is coupled to the load 20. The controller 22 is configured to monitor the load for one or more parameters. For example, the controller 22 can be configured to monitor a current, voltage, power, or other parameter associated with the load 20. Accordingly, the controller 22 can adjust parameters of the power source 12 and active rectifier 16 in response to the load 20.

The controller 22 can be any variety of circuit. The controller 22 can be a processor, a microcontroller, an application specific integrated circuit, a programmable logic device, a combination of such devices, or the like.

Figure 2:
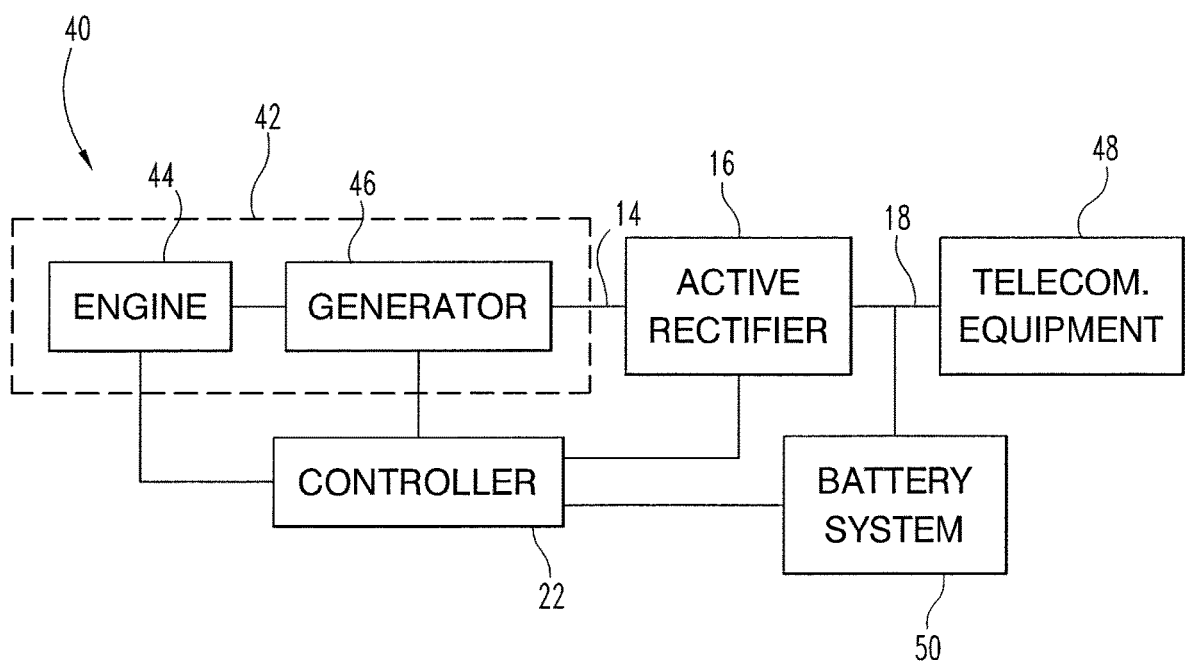
FIG. 2 is a block diagram illustrating a power system according to another embodiment.

FIG. 2 is a block diagram illustrating a power system according to another embodiment. In this embodiment, the system 40 includes a genset 42 including an engine 44 and a generator 46. The generator 46 is a three-phase or single phase generator. The engine 44 is configured to drive the generator 46 to generate the AC output 14. Both the engine 44 and generator 46 are coupled to the controller 22. Accordingly, the controller 22 is configured to adjust parameters of the engine 44 and/or the generator 46 and hence, the output 14.

In this embodiment, as an example, the load includes telecommunications equipment 48. For example, the telecommunications equipment 48 can include wireless communication equipment located at a cellular communication tower. In an embodiment the telecommunication equipment 48 can be located in inaccessible areas such as on mountains or in deep woods. That is, the system 40 and the equipment 48 can be substantially isolated from a substantially continuous power source, such as electrical power mains. This can increase the cost and complexity of getting a work crew or needed supplies to the tower location. In addition, some locations may not have access to utility power or access to reliable utility power. Accordingly, the genset 42 is substantially co-located with telecommunications equipment 48.

In an embodiment, the system 40 has a power rating that can accommodate a peak power required by the equipment 48. However, during non-peak periods, such as during night time or at an installation that is not fully populated, the power rating will be larger than what is needed. A fixed speed genset that is configured to generate the peak power will be operating inefficiently when supplying the relatively reduced power. The fixed speed genset can be reduced in speed. However, the corresponding output voltage, frequency, or the like could vary beyond acceptable ranges.

During such conditions where a reduced power is desired, the controller 22 can be configured to reduce the speed of the engine 44. Accordingly, the output 14 may fall below a threshold that would maintain acceptable operation with a passive rectifier. However, the controller 22 can also be configured to adjust the operation of the active rectifier 16 to boost the reduced output 14 to an acceptable range for the output 18. In other words, the engine 44 can be operated at a more efficient operating point for the reduced power demand. Accordingly, a wider speed range of a genset can be used even if that speed range would cause the output 18 to vary from acceptable values if passively rectified.

In an embodiment, the output 18 can be coupled to a battery system 50. The battery system 50 can be a backup battery bank for the equipment 48. Accordingly, not only can the system 40 supply power to the equipment 48, the system 40 can also be configured to charge the battery system 50. During reduced rate trickle or finish charging of the battery, speed of the engine will be reduced to the lowest speed possible with an active rectifier that boosts up the AC voltage to appropriate charging voltage level.

Although telecommunications equipment 48 installations that are remotely located have been described above, other telecommunications equipment 48 installations can include systems 40 when not located remotely. For example, the system 40 can be a backup power supply for the equipment 48. That is, the system 40 can serve as a backup to a utility main power source.

Furthermore, although cellular communications equipment have been described above as the telecommunications equipment 48, other types of communication equipment can be coupled to a system 40. For example, wired or optical communication equipment can be coupled to a system 40. Moreover, although communication equipment has been described as being powered by the system 40, other equipment, such as lights, monitoring systems, heating and cooling systems, or the like can be powered by the system 40.

Figure 3:
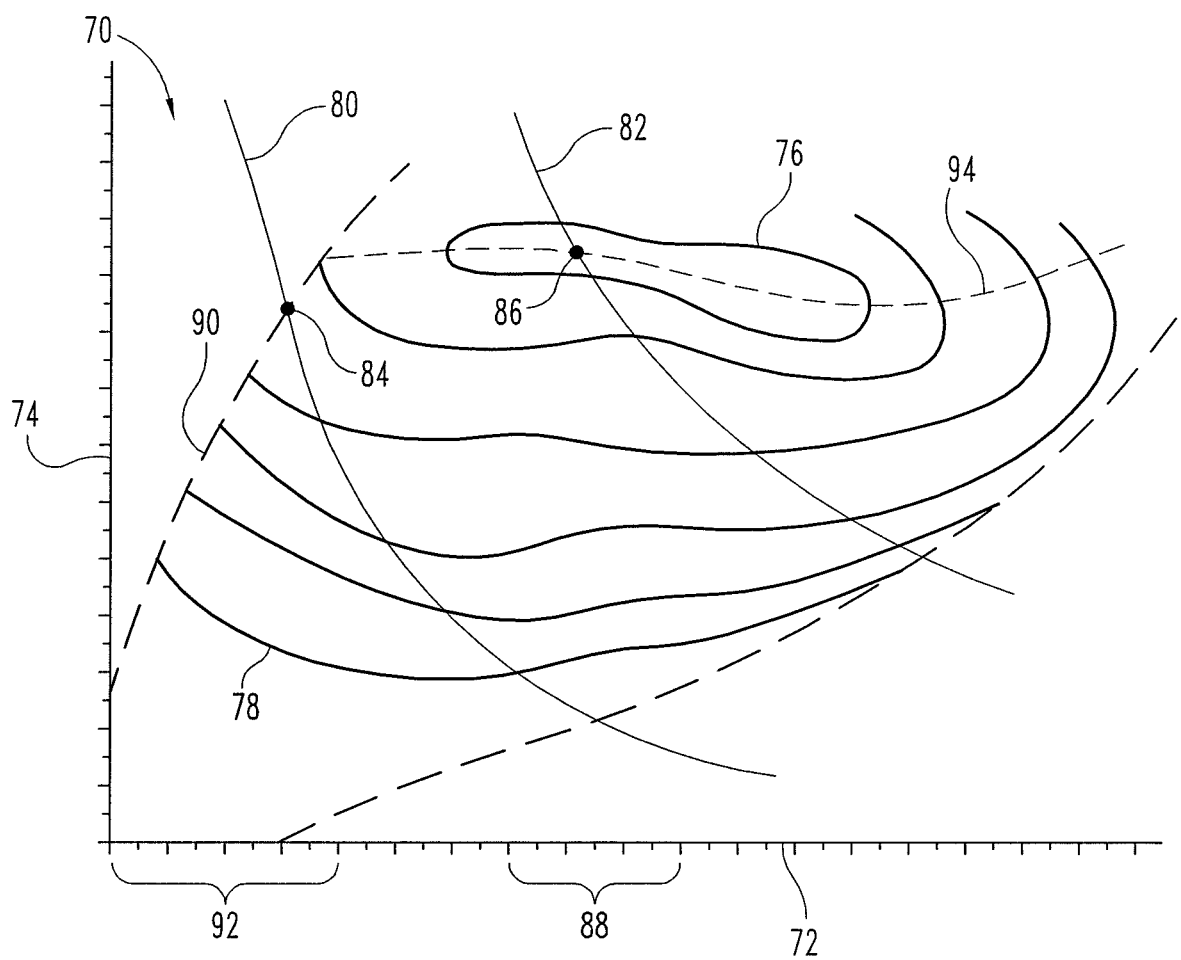
FIG. 3 is a chart illustrating fuel consumption of a power source in a power system according to an embodiment.

FIG. 3 is a chart 70 illustrating fuel consumption of a power source in a power system according to an embodiment. Chart 70 illustrates various fuel consumption contours versus engine speed 72 and torque 74 outputs. For example, contour 78 is a higher fuel consumption contour than contour 76. Curves 80 and 82 represent constant power curves.

Accordingly, for a given output power 82, the engine 44 and generator 46 described above can be operated at or near point 86 to maximize fuel efficiency. Similarly for an output power 80, the engine 44 and generator 46 described above can be operated at point 84. Although point 84 has a lower fuel efficiency, the efficiency the highest achievable along the output power curve 80 and is a relatively high efficiency that can be achieved within the engine 44 operating parameters for the required power output.

The speed range 88 on the speed axis illustrates a more narrow speed range available to the genset that may result from using only a passive rectifier to rectify the DC output 18. Accordingly, the more efficient operating point 84 on power curve 80 would not be available within the limited speed range 88, resulting in lower efficiency. That is, to achieve the output power represented by curve 80 within the available speed range 88 that will produce the required output voltage, a less efficient operating point near fuel consumption contour 78 may be needed.

In an embodiment, for some operating conditions, the controller 22 is configured to reduce the speed of the engine to a minimum operating speed. For example, curve 90 represents a minimum speed for a given torque. The minimum operating speed can, but need not be the actual minimum speed, but can be a minimum speed that accommodates aging, fuel variations, or other operating conditions for the genset 42 and/or system 10. For a range of output power 18 that would fall within range 92, the operating point of maximum efficiency will be the minimum speed. Accordingly, if a particular demand from a load is within the output power curves associated with the range 92, the controller 22 can operate the engine at the associated minimum speed.

Outside of the range 92, at higher output powers, the controller 22 can be configured to operate the engine 44 at a maximum efficiency for the target output power. Regardless of whether the controller 22 operates the power source 42 at a minimum speed or maximum efficiency set point, the active rectifier can be controlled to provide the desired output voltage and current 18. As described above, if the speed of the engine 44 is reduced by the controller 22 during lower power operation, a lower output voltage from the generator 46 can be boosted by the active rectifier 16. Similarly, if the speed of the engine 44 is increased above the speed range 88, possibly creating an output voltage higher than desired, the active rectifier 16 can be controlled by the controller 22 to reduce the output voltage down to the desired level within a certain range.

In an embodiment, the controller 22 can be configured to adjust a parameter of the power source 42 such that output of the power source 42 is at a first level that, if passively rectified, is less than a second level required to reach a target output voltage and/or current. The controller is also configured to adjust a parameter of the active rectifier to reach the target output when the power source 42 is operating at the first level. That is, if the power source 42, whether the engine 44, generator 46, or the like, is controlled to operate outside of the range 88 that would, if passively rectified, provide a desired output, the system 40 can still provide the desired output by appropriately controlling the active rectifier 16.

Although a fuel efficiency map is illustrated in chart 70 with substantially one island of higher efficiency (curve 76), other engines 44 and other power sources can have multiple local efficiency maxima. For example, a change in valve actuation, turbocharger actuation, or the like for different engine 44 operating states can create a variety of local efficiency maxima curves.

Referring back to FIG. 2, in another embodiment, the telecommunications equipment 48 may operate with a high voltage DC system. For example, in one embodiment, the desired output 18 could be +/−200 V. The active rectifier 16 can be configured to boost the output 14 to the higher DC voltage. It is noted that in other telecommunications equipment embodiments a nominal −48V DC output 18 is desired. In another embodiment, the generator 46 of the power source 42 can be configured to generate a high AC voltage. The active rectifier 16 can be configured to reduce the voltage to the desired level, whether a high voltage DC voltage or a lower DC voltage.

Figure 4:
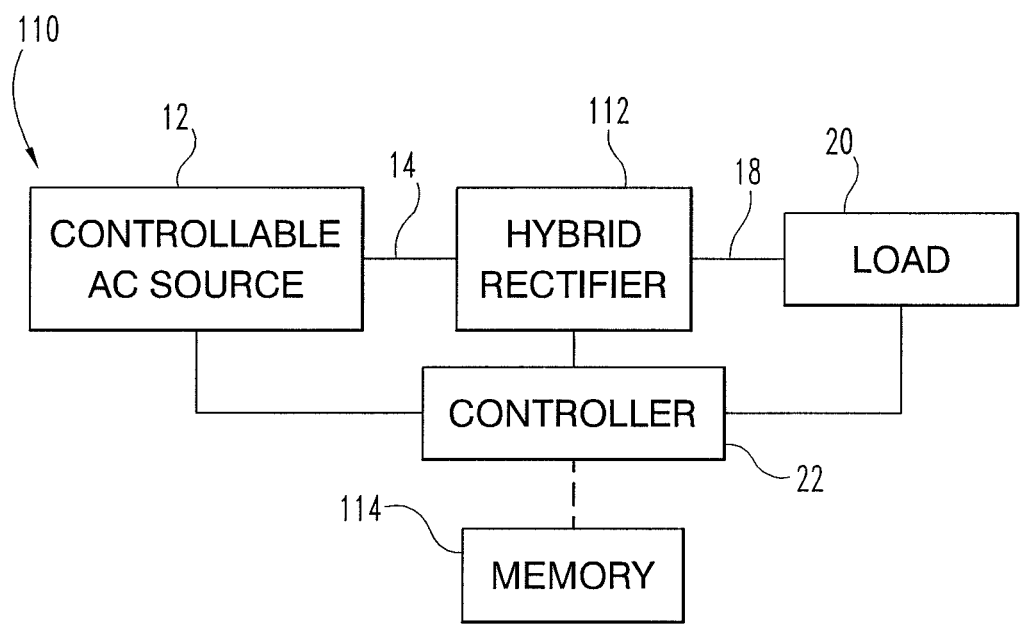
FIG. 4 is a block diagram illustrating a power system with a hybrid rectifier according to an embodiment.

FIG. 4 is a block diagram illustrating a power system with a hybrid rectifier according to an embodiment. In this embodiment, the system 110 includes a hybrid rectifier 112. A hybrid rectifier 112 is a rectifier that can be operated in a passive rectification mode or an active rectification mode. In the passive mode, the output 14 is passively rectified into the output 18. Similarly, the output 14 is actively rectified into the output 18 in the active mode. The controller 22 is configured to switch between the rectification modes in response to a threshold.

In an embodiment, the threshold is an operating point of the controllable alternating current power source at which an efficiency in the passive rectification mode is substantially equivalent to an efficiency in the active rectification mode. For example, an active rectifier can have higher losses than a passive rectifier. However, an active rectifier can allow the power source 42 to operate in a more efficient operating mode that may otherwise be prohibited when using a passive rectifier. The increase in efficiency offsets the lower efficiency of the active rectifier. For example, an active rectifier can allow the engine 44 to be slowed down more than is possible with a passive rectifier, such as with light load conditions. The slower speed can result in a relatively higher efficiency that can make up for the relative efficiency loss of an active rectifier.

During high load conditions, the relative efficiency of the active rectifier can result in higher losses. Accordingly, the hybrid rectifier 112 can be switched into the passive rectification mode. Thus, the higher efficiency of the passive rectifier can result is less loss. Generally speaking, in a conventional active boost rectification topology, active rectification is more efficient to be used when the AC source is operating at a low speed or low AC source voltage output, whereas passive rectification is generally more efficient at high speed, higher AC source voltage output, and higher power outputs.

The threshold used to transition between the active rectification mode and passive rectification mode can be based on factors other than efficiency. In an embodiment, a speed range of an engine over which a passively rectified output is within specified parameters can be used. For example, if the speed of the engine for a given power would be outside of the speed range for efficient rectification, the operation can be changed to passive rectification mode. Similarly, if the speed of the engine is within the speed range, the operation can be switched to the active rectification mode.

In an embodiment, the controller 22 can be coupled to a memory 114. The memory 114 can include any type of data storage system. For example, the memory 114 can include flash memory integrated with the controller 22, discrete memory coupled to the controller 22 through a memory bus, a mass-storage device such as a hard drive, a removable storage device, a combination of such devices and systems, or the like.

The memory 114 can be configured to store efficiency information for the power source 42. For example, the efficiency information can be fuel efficiency information. The efficiency information can also include active and passive rectification mode efficiencies. The efficiency information can also include efficiency information related to the generator 46. Accordingly, the controller 22 can be configured to access the efficiency information to optimize the total efficiency of the system 110, even if some components are operated at relatively less efficient levels.

Figure 5:
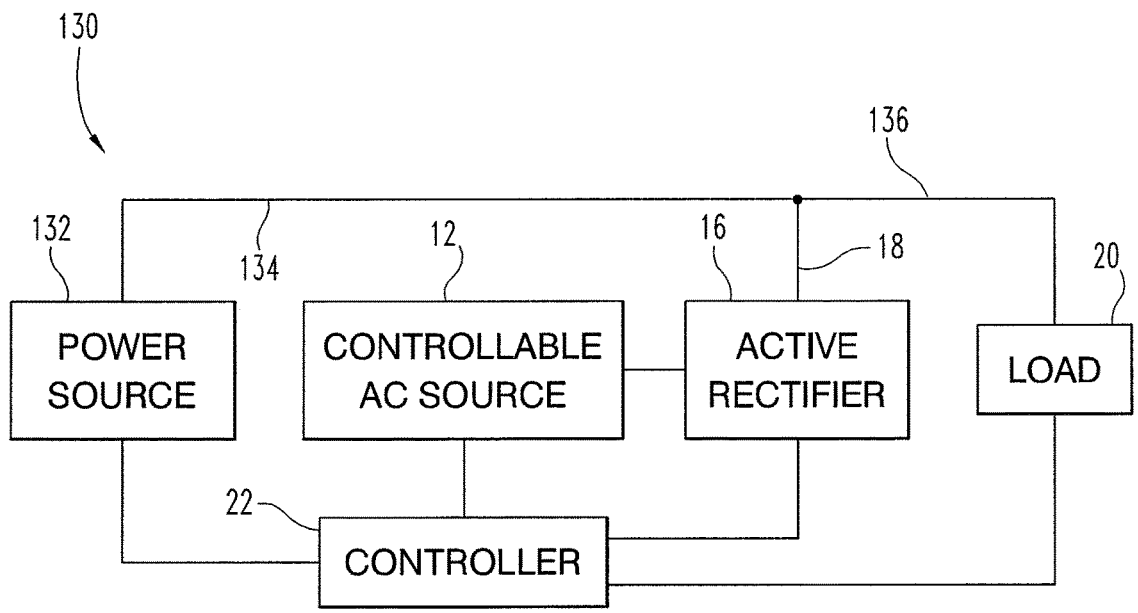
FIG. 5 is a block diagram illustrating a power system with a second power source according to another embodiment.

FIG. 5 is a block diagram illustrating a power system with a second power source according to another embodiment. The various systems described above can be used as primary power sources. However, in an embodiment, the systems described above can be used to supplement other power sources. In this embodiment, the system 130 includes a second power source 132. An output 134 of the second power source 132 is coupled to output 18. Accordingly, the DC outputs 134 and 18 can be combined into output 136 to supply power to the load 20. This operation mode is typically referred to as paralleling. In one embodiment, power source 132 can incorporate one or more of a battery, photovoltaic panel, wind turbine, fuel cell or other DC source. In another embodiment the power source 132 can be configurable, such as with a switch or relay, allowing output 18 of the active rectifier 16 to either provide power to the load 20 by itself, parallel with the power source 132, charge the power source 132, or provide power to or charge both the load 20 and power source 132.

In this embodiment, the controller 22 is configured to supplement the second power source 132 with an output 18 of the active rectifier 16 such that either the controllable AC source 12 or the second power source 132 or the combination of both operate at a greater efficiency than if supplying the entire combined output 136. For example, when a lower power is demanded by the load 20, the controllable AC source 12 may be operating at a relatively inefficient operating point. Supplementing the output 18 of the active rectifier 16 with the power source 132 or operating solely on power source 132 can allow the controller 22 to supply power to the load at a more efficient operating point.

Although a lower power has been used as an example, other conditions can be used to control a balance between the output 134 and output 18. For example, operating conditions, operating environments, fuel supply, or the like can be used to adjust the balance of the outputs 18 and 134. Regardless of the impetus to adjust the outputs 18 and 134, the output 18 can be used to supplement the power from the second power source 132, or vice versa.

The second power source 132 can be a variety of different power sources. For example, the second power source 132 can be another genset or other controllable power source, a mains power source, a battery-based power system, or the like. Second power source 132 can include, but is not limited to, photovoltaic panels, one or more other gensets, hydropower, geothermal, wind turbines, fuel cells, or a secondary battery.

Figure 6:
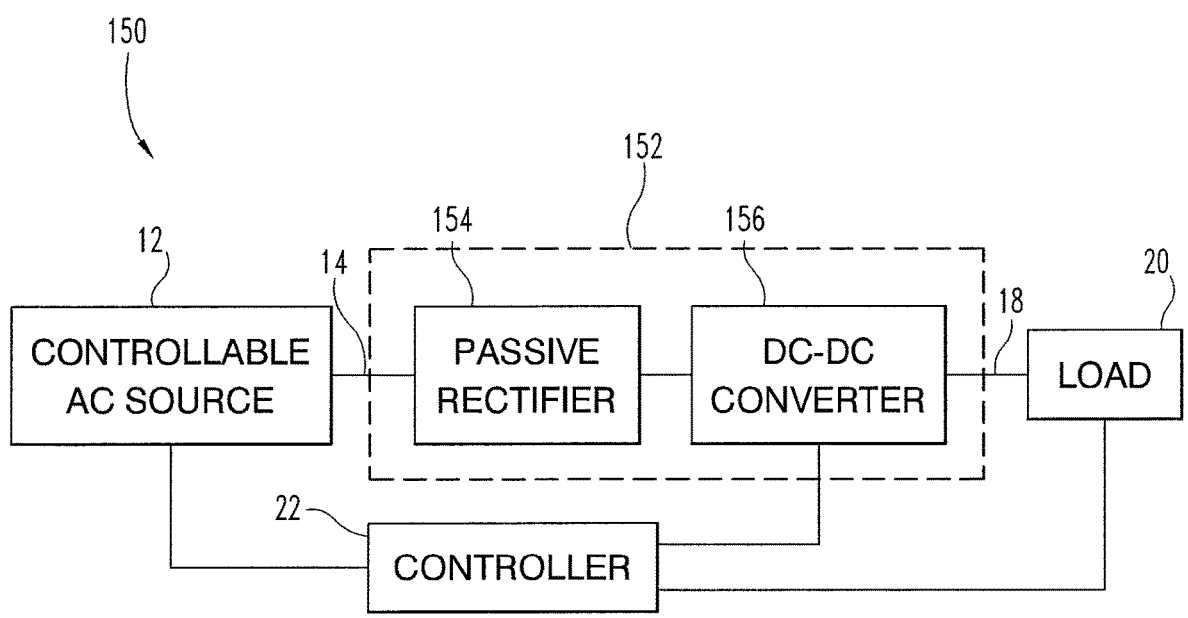
FIG. 6 is a block diagram illustrating a power system according to another embodiment.

FIG. 6 is a block diagram illustrating a power system according to another embodiment. In this embodiment, the system 150 includes an active rectifier 152. The active rectifier 152 includes a passive rectifier 154 and a DC to DC converter 156. In this embodiment, the controller 22 is configured to control the conversion of the DC to DC converter 156. Accordingly, the output of the passive rectifier 154 can vary outside of a specified range due to control of the power source 12; however, the DC-DC converter 156 can be controlled by the controller 22 to boost or reduce the passively rectified output to achieve the desired output 18.

FIGS. 7-10 are schematics illustrating examples of rectifiers for power system s according to various embodiments. These embodiments are examples of active rectifiers that can be used in the various systems described herein. It is further noted that single phase to multiple phase power systems and genset embodiments of the present invention are contemplated and will be apparent to those skilled in the art with the benefit of the present disclosure.

Figure 7:
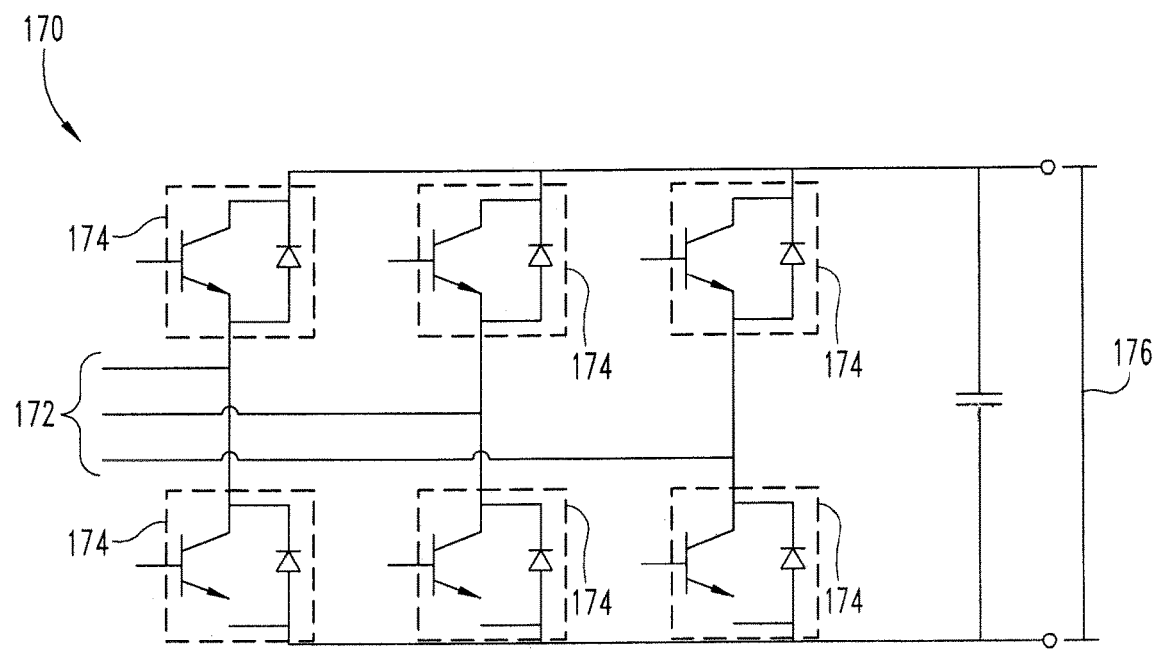
FIGS. 7-10 are schematics illustrating examples of rectifiers for power systems according to various embodiments.

Referring to FIG. 7, the active rectifier 170 includes a three-phase power input 172 and a DC output 176. Switching device 174, illustrated as transistors in this embodiment, are coupled between the output and corresponding portions of the three-phase inputs 172. Passive diodes are also shown incorporated in the transistors of the detailed embodiment switching device 174, allowing it to be utilized in both active and passive rectification modes. It is noted that transistors of other embodiments of the present invention may or may not incorporate these passive diodes. It is further noted that the passive diodes further act as redundant fail over element if the transistor (a controlled switching device, such as an IGBT) is damaged or if the element driving the transistor fails, still allowing passive rectification to occur even if the speed range of the AC source would now be constrained because of the failure.

Figure 8:
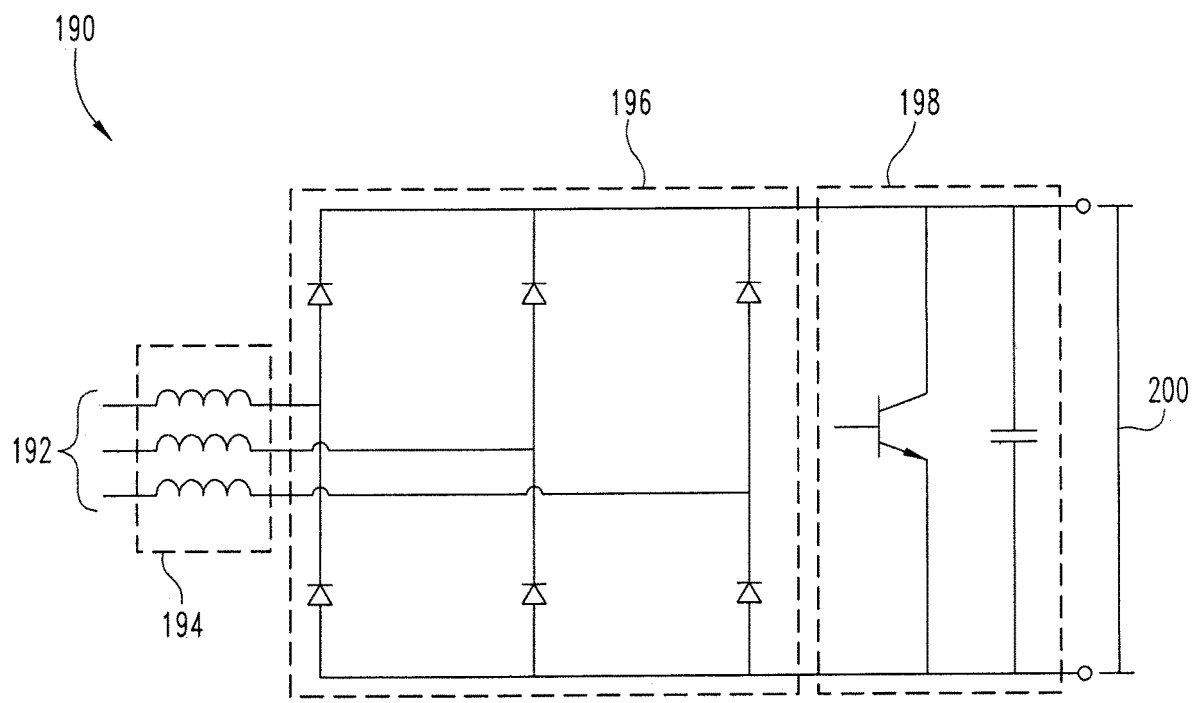

Referring to FIG. 8, the active rectifier 190 can include a three-phase input 192. Inductors 194 (or alternatively, the impedance of the AC source 12) are coupled between the input 192 and the passive rectifier 196. A DC to DC converter 198 is coupled between the passive rectifier 196 and the output 200 to boost or drop the output of the passive rectifier to the required output level.

Figure 9:
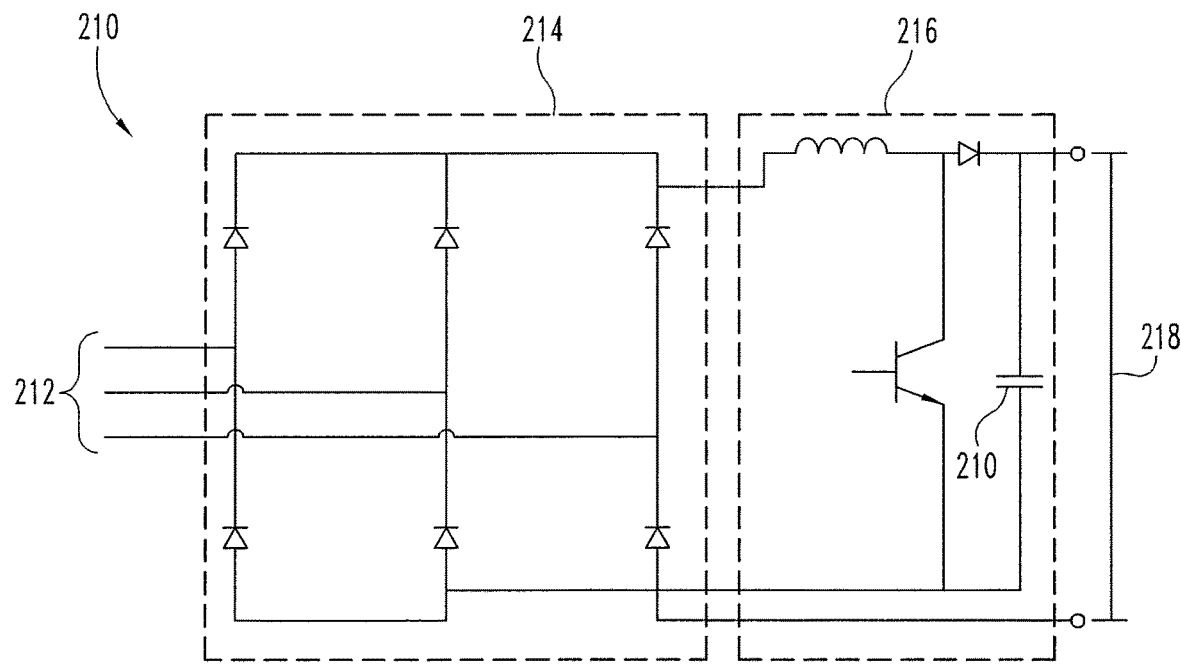

Referring to FIG. 9, the active rectifier 210 includes a three-phase input 212 coupled to a passive rectifier 214. A DC to DC converter 216 is coupled between the passive rectifier 214 and the output 218.

Figure 10:
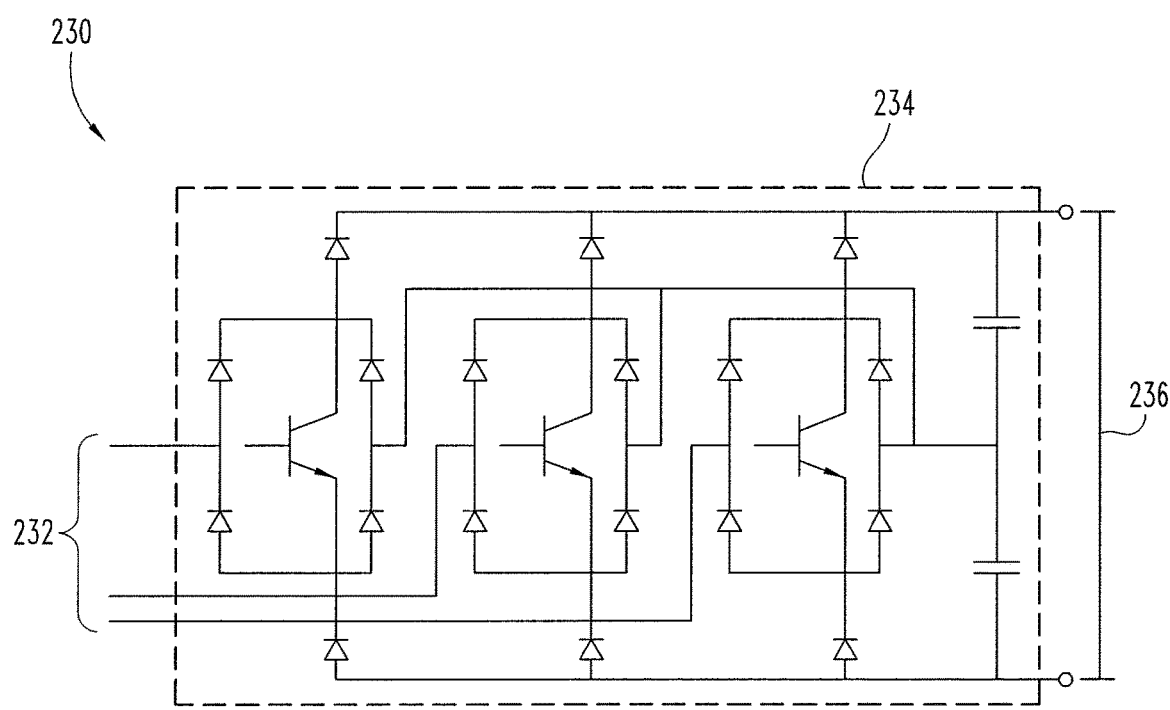

Referring to FIG. 10, the system 230 includes a Vienna rectifier 234 coupled between a three-phase input 232 and an output 236. Although particular examples of active rectifiers have been given, other configurations can be used.

Although any active rectifier can be used, an active rectifier with a reduced number of switching devices can reduce a cost of the system. For example, the active rectifiers 190, 210, and 230 have less switching devices than the active rectifier 170.

An embodiment can include a computer readable medium storing computer readable code that, when executed on an appropriately configured computer, causes the computer to perform one or more of the operations described above. An embodiment can include the controller configured to operate the controllable alternating current power source at one of a maximum efficiency for a target output power, a target noise level for a target output power, or a target emissions level for a target output level. An embodiment can include a memory of the controller configured to store efficiency information for the controllable alternating current power source, and the efficiency information includes one or more of fuel efficiency information, minimal noise information, and maximum service endurance information for the engine.

While embodiments have been described with reference to the drawings, the sprit and scope of the following claims is not limited to the disclosed embodiments, but on the contrary, is intended to cover various modifications, combinations, and equivalent arrangements. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A system, comprising:
a controllable alternating current power source including an engine and a generator configurable to provide a controlled output;
an active rectifier coupled to the controllable alternating current power source and configured to rectify an output of the controllable alternating current power source to supply a direct current to a load; and
a controller configured to adjust a speed of the engine and an output voltage of the direct current of the active rectifier in response to a target output associated with the load, and configured to selectably operate in at least a first mode and a second mode,
wherein in the first mode the controller is configured to: adjust the speed of the engine to a selected first engine speed within limits of a first range of speed in response to the target output falling within a predetermined power output range during passive rectification, not operate the active rectifier, and to operate the engine at a first mode point within the first range of speed, wherein the first mode point corresponds to a point that has a maximized fuel consumption efficiency within an efficiency fuel contour for the selected first engine speed and the predetermined power output range, thereby optimizing fuel efficiency within the first range of speed,
wherein in the second mode the controller is configured to: reduce the speed of the engine to a second engine speed within a second range of speed in response to the target output falling within a predetermined second power output range, operate the active rectifier to boost the output voltage to satisfy the target output and to operate the engine at a second mode point within the second range of speed, wherein the second mode point corresponds to a point that has a maximized fuel consumption efficiency within an efficiency fuel contour for the second engine speed and the predetermined second power output range, thereby optimizing fuel efficiency within the second range of speed, and wherein the second range of speed is lower than the first range of speed.

2. The system of claim 1, wherein the active rectifier is configured to supply one of a boosted high voltage direct current or reduced voltage direct current from the controllable alternating power source to the load.

3. The system of claim 1, wherein:
the controllable alternating current power source is a high voltage power source.

4. The system of claim 1, wherein:
the controller is configured to operate the controllable alternating current power source at one of a maximum efficiency for a target output power, a target noise level for a target output power, or a target emissions level for a target output level.

5. The system of claim 1, further comprising:
a second power source coupled to the active rectifier to form a combined output;
wherein the controller is configured to supplement or charge the second power source with an output of the active rectifier such that the system that incorporates the second power source and controllable alternating current power source operates at a greater overall efficiency.

6. The system of claim 1, wherein:
the controller is further configured to adjust the speed of the engine such that output of the controllable alternating current power source is at a first level that, if passively rectified, is less than a second level required to reach the target output; and
the controller is further configured to adjust the output voltage of the active rectifier to reach the target output when the controllable alternating current power source is operating at the first level.

7. The system of claim 1, wherein the system is substantially isolated from a substantially continuous alternating current power source.

8. The system of claim 1, wherein in the second mode the combined efficiency of the engine operated at the second mode point and the active rectifier operated to boost the output voltage to satisfy the target output is greater than an efficiency resulting from the engine being operated with the speed of the engine limited to the first range and the active rectifier not being operated.

9. The system of claim 1, wherein the controllable alternating current power source is the sole power source for the DC output.

10. A system, comprising:
a controllable alternating current power source including an engine and a generator configurable to provide a controlled output power to satisfy a load;
a hybrid rectifier configured to rectify the controlled output power of the controllable alternating current power source and configurable to operate in an active rectification mode and a passive rectification mode;
and a controller configured to adjust a speed of the engine and to switch an operation of the hybrid rectifier between the active rectification mode and the passive rectification mode in response to the controlled output power and the load, and configured to selectably operate in at least a first mode and a second mode,
wherein in the first mode the controller is configured to: adjust the speed of the engine to a selected first speed limited to a first range of speed in response to the controlled output power falling within a predetermined power output range adapted to the passive rectification mode of the hybrid rectifier, operate the hybrid rectifier in the passive rectification mode, and to operate the engine at a first mode point within the first range of speed, wherein the first mode point corresponds to a point that has a maximized fuel consumption efficiency within an efficiency fuel contour for the selected first speed and the predetermined power output range, thereby optimizing fuel efficiency of the engine within the first range of speed, and
wherein in the second mode the controller is configured to: adjust the speed of the engine to a second speed within a second range of speed in response to the controlled output power falling within a predetermined second power output range, operate the hybrid rectifier in the active rectification mode to boost the output voltage to satisfy the load, and operate the engine at a second mode point within the second range of speed, wherein the second mode point corresponds to a point that has the maximized fuel consumption efficiency within an efficiency fuel contour for the second engine speed and the predetermined second power output range, thereby optimizing fuel efficiency within the second range of speed, wherein the second speed range of speed is lower than the first range of speed.

11. The system of claim 10, further comprising:
a memory configured to store efficiency information for the controllable alternating current power source;
wherein the controller is configured to switch the operation of the hybrid rectifier between the active rectification mode and the passive rectification mode in response to the efficiency information.

12. The system of claim 11, wherein the efficiency information includes one or more of fuel efficiency information, minimal noise information, and maximum service endurance information for the engine.

13. The system of claim 10, wherein in the second mode the combined efficiency of the engine operated at the second mode point and the hybrid rectifier being operated in the active rectification mode is greater than an efficiency resulting from the engine being operated with the speed of the engine limited to the first range and the hybrid rectifier being operated in the passive rectification mode.

14. A method, comprising:
generating an alternating current with an alternating current power source having a controllable output power to satisfy a load,
wherein the alternating current power source includes an engine and a generator;
controlling a speed of the engine;
rectifying the alternating current with a hybrid rectifier configurable to operate in an active rectification mode and a passive rectification mode; and
operating the hybrid rectifier and the engine in a first mode, wherein the speed of the engine is limited to a first range of speed adapted to the passive rectification mode of the hybrid rectifier, the hybrid rectifier is operated in the passive rectification mode, and the speed of the engine is set to a first mode point within the first range of speed, wherein the first mode point corresponds to a point that has a maximized fuel consumption efficiency within an efficiency fuel contour for a set first engine speed corresponding to the controllable output power falling within a predetermined power output range, thereby optimizing fuel efficiency of the engine within the first range of speed, and
operating the hybrid rectifier and the engine in a second mode, wherein the speed of the engine is reduced to a second speed, operation of the hybrid rectifier is switched to the active rectification mode, and the engine is operated at a second mode point in a second range of engine speed below the first range of speed, wherein the second mode point corresponds to a point that has a maximized fuel consumption efficiency within an efficiency fuel contour for the second speed corresponding to the controllable output power falling within a second predetermined power output range, thereby optimizing fuel efficiency of the engine within the second range of speed.

15. The method of claim 14,
further comprising:
reducing a speed of the engine to a minimum operating speed; and
boosting the alternating current to the target output.

16. The method of claim 14, wherein the target output is a high voltage direct current output.

17. The method of claim 14, wherein:
generating the alternating current includes generating a high voltage alternating current; and
rectifying the alternating current includes reducing the controllable output power of the controllable alternating current power source to a target output.

18. The method of claim 14, further comprising:
operating the alternating current power source at a maximum efficiency for a target output power; and
operating the hybrid rectifier to achieve a target output.

19. The method of claim 14, further comprising:
generating power from a second power source; and supplementing the power from the second power source with the rectified alternating current to operate the second power source at a higher efficiency.

20. The method of claim 14, wherein in the second mode the combined efficiency of the engine operated at the second mode point and the hybrid rectifier being operated in the active rectification mode is greater than an efficiency resulting from the engine being operated with the speed of the engine limited to the first range and the hybrid rectifier being operated in the passive rectification mode.

* * * * *